United States Patent [19]

Saunders

[11] Patent Number: 4,739,574

[45] Date of Patent: Apr. 26, 1988

[54] TURTLE EXCLUDER DEVICE

[76] Inventor: Noah J. Saunders, 708 Williams St., Biloxi, Miss. 39530

[21] Appl. No.: 27,875

[22] Filed: Mar. 19, 1987

[51] Int. Cl.$^4$ ............................................. A01K 73/02
[52] U.S. Cl. ........................................................ 43/9
[58] Field of Search ............................ 43/9, 100, 104

[56] References Cited

U.S. PATENT DOCUMENTS

| | | | |
|---|---|---|---|
| 2,511,057 | 6/1950 | Guther et al. | 43/9 |
| 3,132,434 | 5/1964 | Luketa | 43/9 |
| 3,195,261 | 7/1965 | Luketa | 43/9 |
| 4,351,127 | 9/1982 | Mitchell | 43/9 |
| 4,402,154 | 9/1983 | Pence | 43/9 |
| 4,611,424 | 9/1986 | Farantino | 43/100 |

FOREIGN PATENT DOCUMENTS 106086 2/1965 Norway .................................... 43/9

OTHER PUBLICATIONS

*Federal Register*, vol. 52, No. 124, Jun. 29, 1987.

Primary Examiner—Nicholas P. Godici
Assistant Examiner—Karen Skillman
Attorney, Agent, or Firm—Alexander F. Norcross

[57] ABSTRACT

A turtle exclusion device is inserted in a trawl body of a shrimp trawl net immediately before the cod end, and permits the ready escape of entrapped marine turtles. The device is a array of angled, spaced bars, oriented in the direction of trawl flow and affixed to the trawl net, supporting the trawl net through a net entry hoop. An arcuate hinged turtle escape door is attached to the excluder at hinge points intermediate the top and the bottom of the net hoop; the door when closed provides a continuous net section preventing the escape of shrimp, yet is readily opened by the weight and force of an escaping turtle, as the turtle naturally rises up the array of excluder bars. The arcuate shape of the doors particularly adapted to the shape of the shell of the turtle and is more readily activated by the turtle's attempts to escape.

2 Claims, 3 Drawing Sheets 4,739,574

TURTLE EXCLUDER DEVICE

BACKGROUND OF THE INVENTION

Shrimp trawling basically involves the deployment from a fishing vessel of a continuous, large, substantially arced trawl net, suspended between side paravane members (trawl boards) which are shaped so that the forces of trawl dragging cause the net to extend and sweep a substantial swath of ocean space during trawling. Because the desired catch is shrimp, a relatively small ocean crustacean, the trawl nets are considerably finer than are commonly encountered in the capture of species such as fish. Often the trawl is towed for a significant period of time, upwards of twenty-four hours.

In order to reduce the workload involved in periodically emptying the trawl net, the net is sewn so that it tapers into a substantially stronger collecting section, located in the aft middle of the net, and so positioned that it is merely necessary to raise this section or "cod end" to dump the catch on board the shrimp trawler. The main trawl body remains immersed and the trawl continues during this process.

The speed of the tow captures in the nets more sea creatures than the desired shrimp; this is exacerbated by the fact that shrimp is also the preferred food of numerous marine species including fish and marine reptiles, especially sea turtles. The overall trawl speed is such, when trawling for shrimp, that average marine fish can swim against the speed of the flow, and in fact fish can readily enter into the cod end and swim out of the cod end against the force of the flow stream.

Marine reptiles, especially sea turtles, while readily captured in such an arrangement do not have the swimming strength to escape from the cod end. Since a marine reptile, unlike fish, is an air breathing creature the reptile will drown before a given trawl is finished and the nets are raised and dumped. This has provided for a considerable ecological problem where at least one specie of sea turtles, Kemp's Ridley turtles, is already an endangered species. Ecologists have noted over three hundred kills, attributed to the effects of shrimp trawling.

As a result, it has become a matter of public policy to provide a device or apparatus permitting the escape or exclusion of captured sea turtles. Such a device of necessity must also be relatively inexpensive as it must be procured by all shrimp trawling fishermen in a quantity sufficient to equip all trawl nets. The device must additionally not permit or cause any substantial loss of shrimp, although it would be desirable that the device exclude, if possible, fish which are predatory on shrimp during the trawling process.

The National Marine Fisheries, a branch of the United States Government, has identified and certified four separate turtle excluder devices for insertion within the cod end of a shrimp trawl net. The exact description of these devices and their approval is being codified in 50 C.F.R. §§217, 222, and 227, and is the current subject of a proposed rule making.

The basic construction of all of the turtle excluder devices is to provide an angled rigid array located between the trawl body and the cod end, fastened to the trawl nets, which is sufficient to admit the passage of shrimp but which acts a bar to the further passage of larger sea creatures including specifically sea turtles. The angled effect further provides for deflection of the turtle before the cod net. One of the turtle excluder devices provides for a vertically angled bar array with the forward (in the sense of in the direction of trawl) end being at an upper portion and the after end being at a lower portion, and providing a sufficiently large hole (turtle hole) within the trawl net for the turtle to escape. While it is believed that this device will also provide for the elimination of fish, it is also considered that the device has an excessive shrimp loss rate as the shrimp are free to exit the turtle hole.

A second device uses vertically ascending parallel PVC pipe, providing for openings between each section of pipe for the passage of shrimp. In this device the angle is from a forward lower end to an aft upper end and a loose section of net is provided which is considered adequate to allow the turtle to push free. The loose net, being unsecured, has a definite wave or flapping action during tow and is considered to provide again for an excessive loss of shrimp.

The third such device provides for a flat trap door hinged to the turtle extraction bars and covered with a section of net. Again, the opening of the door and the fluttering of the door is considered likely permitting excessive loss of shrimp and in addition the extending portion of the net along the trap door is considered to provide significant problems in regards to catching or snagging on the shell of a turtle.

SUMMARY OF THE INVENTION

It is the purpose of the current invention to show an improved form for a turtle exclusion device by providing, appended to an angled bar turtle exclusion device, a particular form of trap door escape which is shaped so as to adapt to the shell shape of a turtle, providing for a more ready opening and escape of the sea turtle, and is angled, hinged and pivoted to the overall excluder so as to provide for a positive closing effect, preventing the loss of shrimp, when not actually being activated by an escaping turtle.

The exact apparatus configuration providing for such an effect may best be seen by the detailed description of the preferred embodiment as follows.

It is thus an object of this invention to provide a turtle exclusion device which provides for more ready opening and release of turtles before they are caught within the cod end of a shrimp trawl;

It is a further object of this invention to provide a turtle exclusion device which has significantly reduced loss of shrimp when not actually releasing a turtle;

It is a further object of this invention to provide a turtle exclusion device which provides minimum drag increase and weight increase to a shrimp trawl.

It is a further object of this invention to provide a turtle exclusion device that is readily inserted within the trawl body of a shrimp trawl immediately before the cod end at a minimum cost and effort for re-configuring existing shrimp trawl nets.

These and other objects of the invention may be more readily seen from the detailed description of the preferred embodiment of the invention described below.

DETAILED DESCRIPTION OF THE PREFERRED EMBODIMENT

Figure 1:
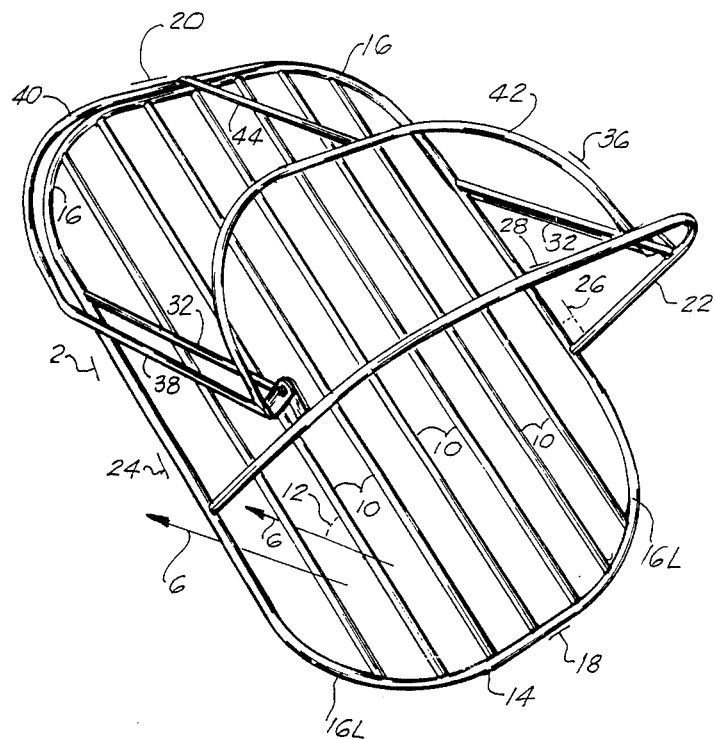
FIG. 1 is an angled view of the turtle excluder of the current invention the net removed for clarity showing the relationship or angle of the turtle excluder with its to standard stream flow.
Figure 2:
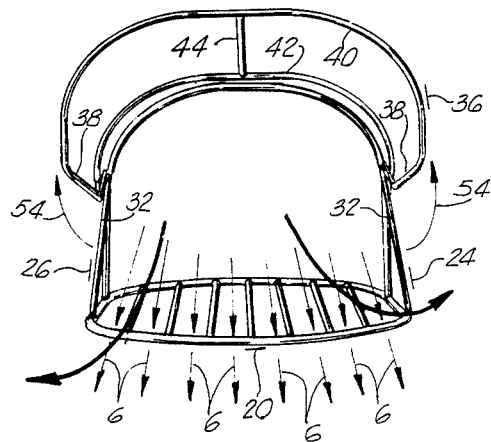
FIG. 2 is a view of the turtle excluder, against stream flow down through the open door, showing the door open for escape of a turtle, again with net removed for clarity.
Figure 3:
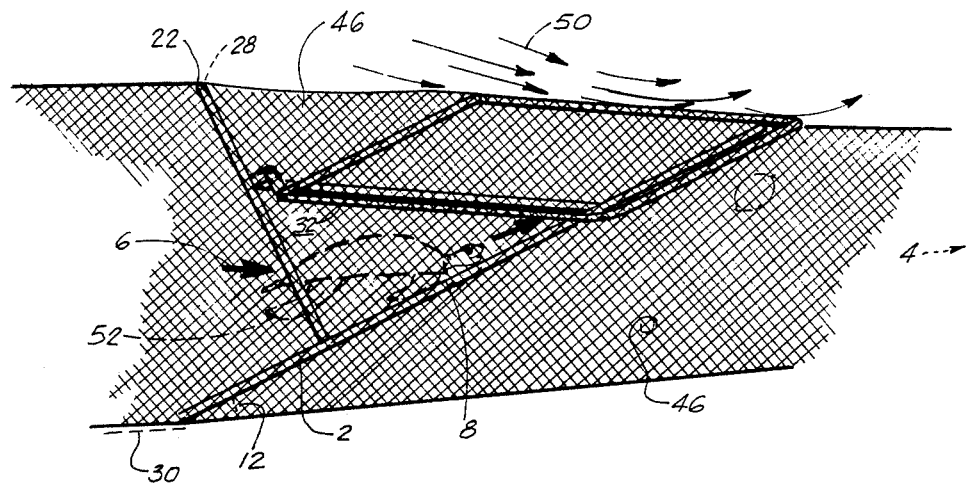
FIG. 3 is a view of the turtle excluder in the normal stream flow position showing a sea turtle encountering the excluder.
Figure 4:
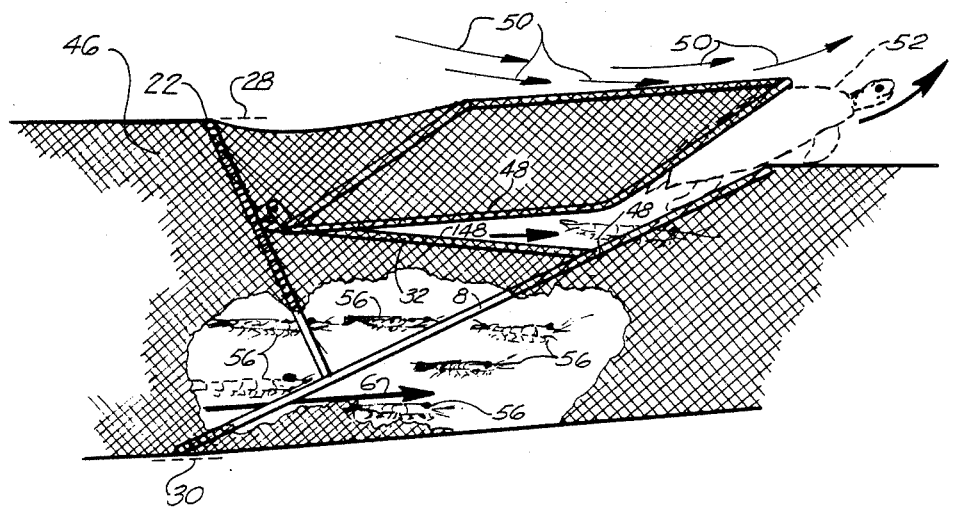
FIG. 4 is a view of the turtle excluder and the operational door open position showing the escape of a sea turtle and retention of shrimp, the shrimp and the turtle not being to exact scale.

Referring to FIG. 1 in conjunction with FIG. 3 a first turtle excluder device (TED) 2 is shown in FIG. 1 without the enclosing net section or cod end section 4 for clarity. Inasmuch as the TED 2 in FIG. 1 and the TED 2 in FIG. 3 are in reversed orientation, streamlines 6 are provided to show the relative direction of water flow when TED 2 is towed through the water in the typical trawling position.

TED 2 is seen to comprise in its major assembly an array 8 of substantially parallel member 10 oriented at an angular relationship 12 to streamlines 6. Array 8 is surrounded by peripheral support member 14 having essentially arcuate corners 16.

The entire TED 2, including array 8 and its constituent members is preferably formed of a lightweight non-corrosive metallic alloy such as aluminum. Bars 10, and peripheral support member 14 are inter-fastened by welding to provide a light but strong array. The angular relationship 12 between the array 8 and flow streamline 6 defines a lower, forward end 18 of array 8 and an upper trailing end 20 of array 8.

At a position adjacent or near lower end 18 of array 8 is mounted ascending net brace 22.

Figure 5:
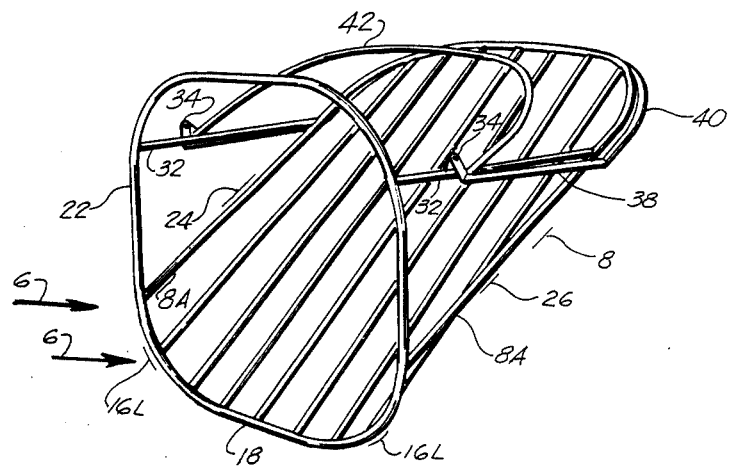
FIG. 5 depicts embodiment having a unitary net support brace.
Figure 6:
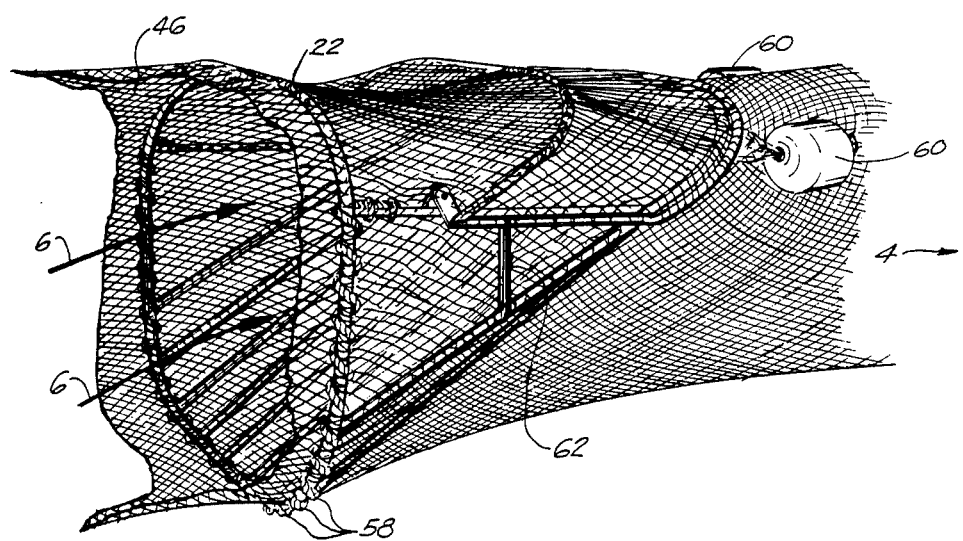
FIG. 6 depicts the preferred embodiment in a net.

In the embodiment shown in FIG. 1 brace 22 is an essentially arcuate structure affixed on support member 14 adjacent a lower corner 16L, arising vertically therefrom forming an arced hoop, descending to a position affixed on support member 14 adjacent a second lower corner 16L. In a second embodiment of the invention as shown in FIG. 5 net brace 22 is an essentially oval tubular structure arising from, and as part of a first lower corner 16L ascending vertically across to a second lower corner 16L defining thereby an oval opening substantially perpendicular to streamlines 6.

In this second embodiment lower corner 16L are further shaped by having individual array bars 8A installed at a rising angle with respect to array 8 so as to more smoothly capture a turtle.

The combined structure of net brace 22 and array 8 thereby defines a first side 24 and a second side 26 of TED 2. The ascending brace 22 further defines an upper end or upper net support line 28, lower end 18 of array 8 similarly defining a lower net support line 30.

At a distance along first side 24 and second side 26 of brace 22, at a point intermediate upper line 28 and lower line 30 are found symmetrically provided lateral support members 32, affixed along a line substantially parallel to streamline 6, from points on net brace 22 to a horizontally corresponding point along support member 14. It can thus be seen that lateral support members 32 define a line, substantially parallel to streamline 6, and intermediate upper net support line 28 and lower net support line 30. Symmetrically disposed, upon first side 24 and second side 26 of lateral support members 32 are found two turtle door hinge points 34. Pivotally affixed to turtle door hinge points 34 is turtle escape door 36.

Turtle escape door 36 is constructed as a framework defining a substantially ovoid semi-cylindrical member, extending from each of the hinge points aft along mutual door lower side braces 38 from the hinge point 34 to a point adjacent peripheral support member 14. There being two sides, there are two side braces 38. At the forward point of each of side braces 38, corresponding to the position adjacent support members 14 is forward turtle shell door brace 40, formed in an arcuate shape corresponding to the upper arcuate shape of peripheral support member 14, and extending in covering relationship thereto.

At least one second turtle shell door brace 42, identical in shape to door brace 40 and mounted parallel thereto is affixed from a point adjacent hinge points 34 on door side braces 38, affixedly interconnecting the two lower side braces 38. For strength and rigidity, and to aid the utility of turtle door 36 there is affixed intermediate an upper point on first turtle door brace 40 and second an upper point on second turtle door brace 42 upper spine support 44 providing additional bracing substantially parallel to streamline 6.

The entire TED 2 is installed immediately forward of cod end 4 by being affixed to trawl body net 46, with a provided net cut 48, adapted to permitting the opening and closing of turtle escape door 36, which net cut follows the line defined by the point starting at a first hinge point 34 extending thence, in the direction of streamline flow 6 along the corresponding lateral support member 32 to the point of attachment to support member 14 thence across the upper edge 20 to a point of attachment of the second lateral support member 32 thence against the flow of streamline to second hinge point 34 thence along the corresponding turtle door side brace 38, extending thence to the aft or first shell door brace 40, across the periphery of shell door brace 40 and thence along the second lower side brace 38 to the hinge point point of origin.

Net 46 is fastened at frequent intervals along this periphery described above to form an opening or net cut 48 in the net. In addition, inasmuch as the trailing cod end by weight drags along the seabed, as the cod end may contain during trawling upwards of a ton or more of captured shrimp, there is provided, interwoven through the mesh of net 46 around the periphery of at least the lower portion of net support 22 an abrasion reducing means 58. In one embodiment of the invention the abrasion reducing means is provided by tying and wrapping a substantially stout polypropylene line, spaced to every third mesh opening, and extending from the point of attachment of one side brace 32 along the outer periphery of net support 22 around bottom edge 18 and up, ending at the point of attachment of the other lateral support member 32. This line protects net 46 from abrasion that might otherwise occur from the rubbing effect occasioned by net support 22 during the trawl operations.

In operation, the entire assemblage being enclosed in the cod end is towed as part of a shrimp trawl, creating a water flow along streamlines 6. The off center location of hinge point 34, being located intermediate upper net line 22 and lower net line 30 is such as to create stream flow pressure 50 along turtle escape door 36. Although net 46 is porous nonetheless it has sufficient drag that it produces a moment couple about hinge points 34 which maintains turtle door 40 in a substantially closed position. This closure may be aided by the installation of door closure springs 62, extending from a point on door side braces 38 to a point on outer array bars 8A. These springs can be bungee cords or rubber, and the closure strength (lever arm) is easily adjusted by lateral positioning along braces 38 to assure positive closure under tow. The slight overlap, described above in which shell brace 40 overlaps and encloses upper end 18 of support member 14 provides a sealing escape and prevents escape of shrimp or other caught species while the turtle door is closed.

When a turtle 52, trapped in the trawl approaches the cod end 4 it will encounter array 8, and supported by bar members 10 and pushed by streamline flow 6 of the water will ascend array 8 against turtle door 36.

The curvature of the shell of the turtle encounters the particular curvature of the door braces 40, 42, and the natural motion of the turtle aided by its exertions against array 8 and by the stream force of water causes door 40 to rotate, against the drag of streamline flow 50 and optional springs 62 around hinge points 34. This hinge rotation 54 opens net cut 48 sufficiently to allow the turtle to escape. Nonetheless the shrimp 56 being poor swimmers and thus having limited maneuverability, are propelled by the force of water along streamline flow 6, and, passing through bar members 10, remain entrapped.

Immediately subsequent to the departure of turtle 52, the force of streamline 50 and, optionally, springs 62 closes turtle door 36, sealing it against escape of shrimp as described above.

It is found that the off centering of hinges 34, the overlapping of the turtle door brace 40 and the upper end 18 of array 8 both combine to provide a better seal than in the prior art and substantially prevent the loss of desirable shrimp. In addition it is found that the curvature of turtle door braces 40, 42, is particularly adapted to the shape of the shell of the turtle, easing the turtle's opening of door 36 and substantially increasing the probability of a successful turtle escape. Upper spine member 44, interconnecting the turtle door braces 40, 42 additionally aids by encountering the shell of turtle 52 and providing a positive, non-snagging point of first pressure for the turtle to open turtle door 36.

It is thus apparent from the description of the embodiments of the invention that the particular invention as claimed below provides a more adequate turtle exclusion device in that it provides for a positive escape with significantly reduced chance of fouling the turtle's shell while at the same time providing a positive closure, which prevents the escape of desirable shrimp during the general trawling where no turtles are encountered.

It should be apparent to those skilled in the art that within the general description given, a wider range of embodiments is possible, while still encompassing the basic features and improvements of the current invention, and thus the invention is not restricted to those specific embodiments described but rather the wider range of equivalents encompassed by the claims below.

I claim:

1. A device for exclusion of sea turtles from a shrimp net during trawling stream flow, adapted for insertion within the trawl body before the cod end of a continuous shrimp trawl net comprising:
   a. a contiguous array of spaced bar members affixed within a trawl net at a substantial angle to the stream line flow of said net;
   b. a net support member perpendicularly affixed to said barred array, extending along a forward direction of said array in a direction transverse to stream flow, extending vertically from a first side of said angled bar array, arising in an arcuate shape supportable against the net to an angularly descending affixation to a second opposite side of said bar array;
   c. a first horizontal bracing member substantially parallel to said stream flow, extending for a first aft end affixed to a point on said bar array to a second forward end affixed to a point on said perpendicular net support member;
   d. a second horizontal bracing member substantially parallel to said stream flow, extending from a first aft end affixed to a point on said bar array to a second forward end affixed to a point on said perpendicular net support member;
   e. a first hinge point on said first bracing member;
   f. a second hinge point on said second bracing member;
   g. an escape door member, having at least two arcuate net supporting members, affixed pivotally to said first and second hinge points, extending aft along said stream flow;
   h. said trawl net being affixed to a first, forward said arcuate support member, and extending and affixed to each arcuate member of said door but being severed net along a line corresponding to the outer periphery of said arcuate door member, adjacent said bracing member.

2. A device as described in claim 1 wherein said door member further comprises:
   a. first side arm member hingedly affixed to said first hinge point extending substantially parallel and in the direction of said stream flow;
   b. second side member, pivotally affixed to said second hinge member extending substantially parallel and in the direction of said stream flow;
   c. first arcuate net support means, affixed to said first bar member arising therefrom substantially perpendicular to said stream flow in a substantially arcuate shape across to said second bar member to a point of affixation thereupon;
   d. at least one additional said arcuate support member extending vertically from said first bar member in an arcuate curve to said second bar member at a spaced distance from said first net support member;
   e. said trawl net being separably affixed to said first bar member to said second bar member and to each of the arcuate net support members; and
   f. said hinge point being spacingly offset, intermediate a first position defined by an upper edge of said net support member and a second position defined by a lower edge of said array.

* * * * *